(12) United States Patent
Tanaka

(10) Patent No.: US 7,605,699 B2
(45) Date of Patent: Oct. 20, 2009

(54) SYSTEM AND METHOD FOR LOCATION RECOGNITION USING IC TAGS

(75) Inventor: Takashi Tanaka, Tokyo (JP)

(73) Assignee: LSI Japan Co., Ltd., Shibuya-Ku, Tokyo (JP)

( * ) Notice: Subject to any disclaimer, the term of this patent is extended or adjusted under 35 U.S.C. 154(b) by 168 days.

(21) Appl. No.: 10/597,112

(22) PCT Filed: Jan. 13, 2005

(86) PCT No.: PCT/JP2005/000620
§ 371 (c)(1),
(2), (4) Date: Aug. 15, 2006

(87) PCT Pub. No.: WO2005/069499

PCT Pub. Date: Jul. 28, 2005

(65) Prior Publication Data
US 2007/0103301 A1 May 10, 2007

(30) Foreign Application Priority Data
Jan. 13, 2004 (JP) .............................. 2004-005883

(51) Int. Cl.
G08B 13/14 (2006.01)

(52) U.S. Cl. ...................... 340/572.1; 235/375; 235/385

(58) Field of Classification Search ... 340/572.1–572.9, 340/10.1, 825.49; 235/375–385
See application file for complete search history.

(56) References Cited

U.S. PATENT DOCUMENTS 5,363,425 A * 11/1994 Mufti et al. ............ 370/201.06

(Continued)

FOREIGN PATENT DOCUMENTS

JP 2003-158470 5/2003

(Continued)

OTHER PUBLICATIONS

English language Abstract of JP 2003-158470.

(Continued)

Primary Examiner—Davetta W Goins
Assistant Examiner—Edny Labbees
(74) Attorney, Agent, or Firm—Greenblum & Bernstein P.L.C.

(57) ABSTRACT

Locations of IC tags affixed to items are automatically recognized without requiring interrogators or antennas are allocated at respective inventory locations.

To attain this object, interrogator 1 firstly transmits a unique ID readout command specifying read range, and corresponding IC tags 2a, 2b, 2c sequentially reply their unique IDs (Xa), (Xb), (Xc) respectively.

At the same time, interrogator 1 transmits a probe signal send out command specifying ID, and corresponding IC tags 2a, 2b, 2c sequentially send out probe signals respectively.

IC tag 2 that detects a probe signal with reception strength more than a predetermined level stores in its memory IDs (Xa), (Xb), (Xc) that interrogator 1 specified as adjacent ID.

Then, interrogator 1 transmits an adjacent ID readout command specifying ID, and corresponding IC tags 2a, 2b, 2c sequentially reply adjacent IDs (Xb), (Xa.Xc), (Xb) stored in their memory respectively.

Lastly, all possible combinations (Xa-Xb), (Xb-Xa), (Xb-Xc), (Xc-Xb) of unique IDs (Xa), (Xb), (Xc) and adjacent IDs (Xb), (Xa.Xc), (Xb) that controller 3 has collected via interrogator 1 are obtained and any identical combinations are excluded so that (Xa-Xb), (Xb-Xc) remain as final combinations, and the final combinations having one side in common are joined to produce a link pattern of ID information.

Thus, it is understood that IC tags 2a, 2b, 2c exist in the same communication area B, and are arranged in order of 2a, 2b, 2c.

9 Claims, 11 Drawing Sheets

U.S. PATENT DOCUMENTS

| | | | |
|---|---|---|---|
| 5,434,775 A * | 7/1995 | Sims et al. | 705/8 |
| 5,528,232 A * | 6/1996 | Verma et al. | 340/825.49 |
| 5,742,237 A * | 4/1998 | Bledsoe | 340/825.49 |
| 5,774,876 A * | 6/1998 | Woolley et al. | 705/28 |
| 5,952,922 A | 9/1999 | Shober | |
| 6,333,690 B1 * | 12/2001 | Nelson et al. | 340/539.21 |
| 6,972,682 B2 * | 12/2005 | Lareau et al. | 340/568.1 |
| 2003/0030568 A1 * | 2/2003 | Lastinger et al. | 340/825.49 |
| 2006/0017544 A1 | 1/2006 | Tanaka et al. | |
| 2008/0150691 A1 * | 6/2008 | Knadle et al. | 340/10.1 |

FOREIGN PATENT DOCUMENTS

| | | |
|---|---|---|
| JP | 2004-038621 | 2/2004 |
| WO | 02/103645 | 12/2002 |

OTHER PUBLICATIONS

English language Abstract of JP 2004-038621.

* cited by examiner

SYSTEM AND METHOD FOR LOCATION RECOGNITION USING IC TAGS

TECHNICAL FIELD

This invention relates to a location recognition technology to be utilized for tracking locations of items provided with IC tags, whose ID can be identified by contactless means.

BACKGROUND ART

IC tags with IDs that can be identified by contactless means have been used in many different fields, such as merchandise recognition, individual attestation, and forgery prevention of banknotes or negotiable securities, and are now more widely utilized in extended fields, such as production lines and distribution of goods.

Especially, by affixing IC tags to items, a big effect is expected in not only product processing and distribution control, but also inventory control To achieve accurate and prompt inventory control, it is desired that items be automatically located.

In order to have items automatically located, it is necessary to allocate an interrogator (RFID interrogator) at each and every inventory location, providing 1 to 1 correspondence between the interrogator and the inventory location, so as to recognize the inventory location by the interrogator's individual address.

Alternatively, an antenna can be allocated at each and every inventory locations having 1 to 1 correspondence between the antenna and the inventory location so as to recognize the inventory location by the antenna's individual address.

When searching an item in a particular inventory location, the address of its interrogator or antenna is specified and IDs of items therein are read.

When searching an inventory location where a particular item is placed, the addresses of interrogators or antennas are sequentially designated and all IDs of items in each inventory location are respectively read. The inventory location can be recognized from the address of an interrogator or an antenna being designated when target ID is detected.

Disadvantageously, however, interrogators use the same frequency and thus mutual interference would occur and disturb communication when multiple interrogators are closely allocated. Further disadvantageously, when reading IDs of items per designated antenna, radio waves would reach adjacent inventory locations and IDs of items therein would be mistakenly read.

To prevent such misreading, it is necessary to deliberately shield the inventory locations from each other, but this results in increasing restrictions on the inventory locations.

SUMMARY OF THE INVENTION

In order to solve the problems that mutual interference would occur and disturb communication when a plurality of interrogators are allocated at respective inventory locations, and that misreading would be caused as radio wave would reach adjacent inventory locations when IDs of items are read per designated antenna, the present invention is aimed at providing means for automatically locating IC tags affixed on items without having to have to allocate an interrogator or an antenna at each and every inventory location.

To attain this object, the main claim of the present invention comprises a system for location recognition using IC tags, wherein an interrogator makes a first communication with multiple IC tags existing in a communication area A by radio, and at the same time, said IC tag makes a second communication with other IC tags existing in a communication area B (<A) by probe signals, said IC tag comprising;

a first response means for responding own information X to the interrogator, a transmission means for sending out said probe signals to die other IC tags when own information X is specified by the interrogator, a reception means for receiving said probe signals sent out by one of the other IC tags whose information Y is specified by the interrogator, a storage means for storing information Y of the other IC tag specified as a source by the interrogator in a memory when reception strength of said probe signal is more than a predetermined level, and a second response means for responding information Y of the source IC tag stored in the memory to the interrogator according to a second readout command, whereby relative positions of said IC tags are recognized from the information X and the information Y collected via said interrogator.

DETAILED DESCRIPTION OF THE PREFERRED EMBODIMENT

Some preferred embodiments of the present invention are described hereinafter.

Figure 1:
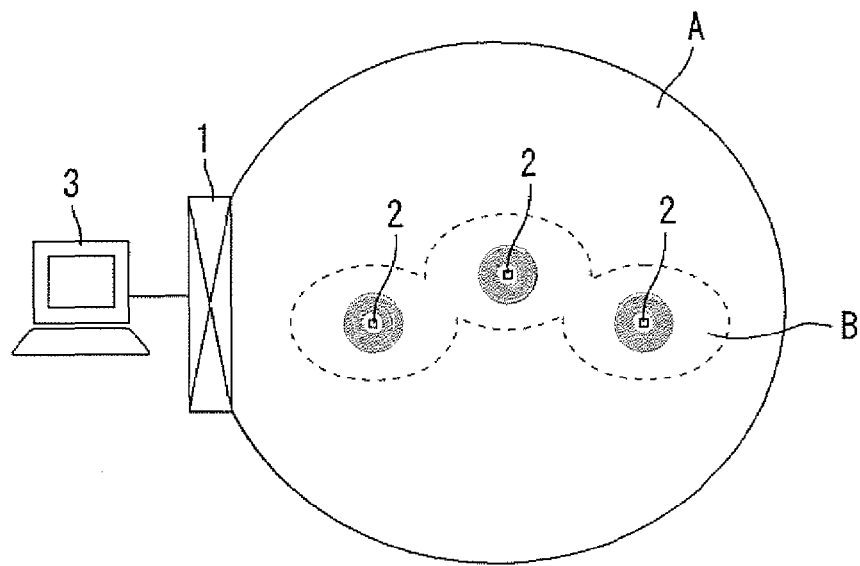
FIG. 1 is a schematic view of the location recognition system using IC tags according to the present invention.

A schematic view of a location recognition system using IC tags according to one embodiment of the present invention is shown in FIG. 1.

In the location recognition system using IC tags, multiple IC tags 2 with antennas are located within a communication area A of an interrogator 1. By a command from a controller 3, IC tags 2 and interrogator 1 conduct a first communication, whose communication range is comparatively long and extends between a few centimeters and a few meters. At the same time, in a communication area B, IC tags 2 make a second communication using probe signals, whose communication range is relatively shorter than that of the first communication.

The communication range of the second communication differs depending on sizes and arrangement of items to which IC tags 2 are affixed, and for example, it is desirable that the communication range and the arrangement intervals of IC tags 2 are set in nearly equal length.

Omnidirectional propagation media that become attenuated progressively with distance, such as; radio wave, magnetism, sound, and light are used as probe signals.

When radio wave is used as probe signals, different modulation methods may be employed to operate the first and second communications, such as ASK modulation method for operating the first communication and FSK modulation method for operating the second communication.

In the same way, different frequency bands may be employed to operate the first and second communications. For example, the first communication may be operated in the 13.56 MHz bands or 2.45 GHz bands, while the second communication is operated in the 125 kHz bands or 13.56 Mhz bands.

Figure 2:
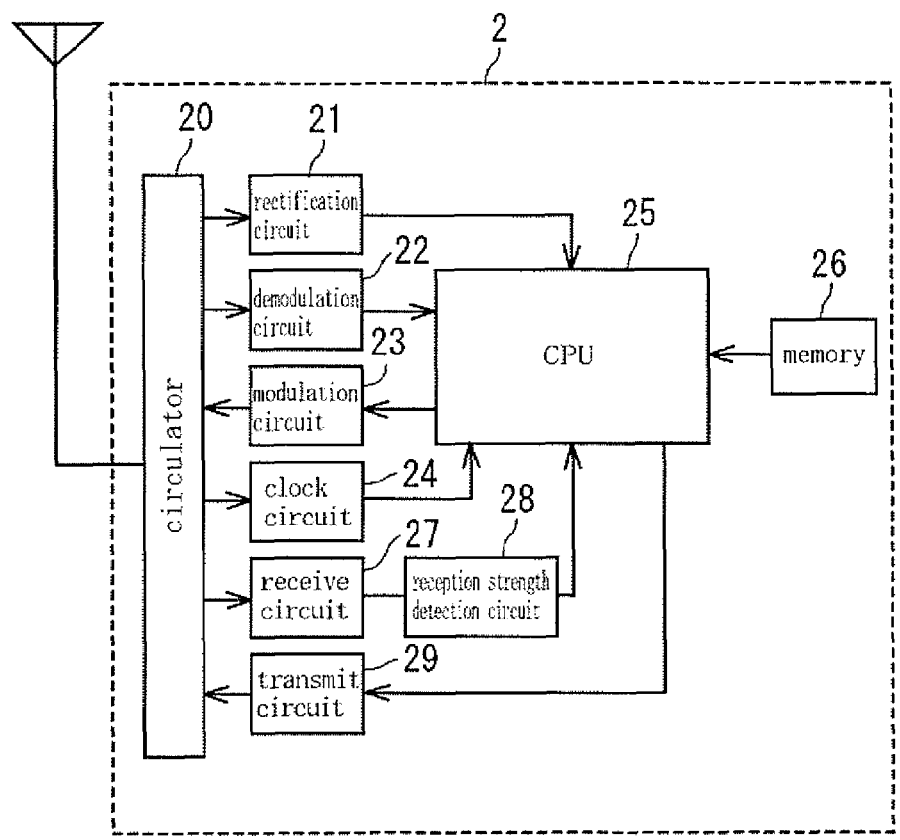
FIG. 2 is a block diagram of the IC tag according to the present invention.

A block diagram of an IC tag according to one embodiment of die present invention is shown in FIG. 2.

The embodiment described hereinafter uses radio wave as probe signals, but the present invention is not limited to this example of using radio wave as probe signals.

Each of IC tags 2 is comprised of: a first communication part including a rectification circuit 21 a demodulation circuit 22, a modulation circuit 23, and a clock circuit 24, all of which are connected to a circulator 20; a control part, including a CPU 25 and a memory 26; and a second communication part including a receive circuit 27, a reception strength detection circuit 28, and a transmit circuit 29, all of which are also connected to circulator 20.

In the location recognition system using IC tags as constructed above, interrogator 1 modulates a request signal and transmits RF energy to IC tags 2 within communication area A so that inductive voltage will be generated at antennas of IC tags 2.

Rectification circuit 21 rectifies this inductive voltage to provide a power source for activating IC circuits, and clock circuit 24 uses a frequency of power for generating clock for IC synchronization.

When power and clock are supplied to the IC circuits, demodulation of the request signal received via circulator 20 is performed by demodulation circuit 22 while being synchronized with the clock. CPU 25 then interprets the demodulated request signal to produce a reply signal that responds to the request signal, and modulation circuit 23 modulates the reply signal and transmits it back to interrogator 1 via circulator 20.

IC tags 2 detect RF energy sent by interrogator 1 to generate inductive voltage and rectify it to provide a power source for activating the IC circuits. IC tags 2 may be an active type provided with internal batteries when it is desired that comparatively longer range of communication with stability be obtained.

Simultaneously, transmit circuit 29 of a source IC tag 2 transmits a probe signal via circulator 20 to the other IC tags 2 within communication area B. Receive circuit 27 of these other IC tags 2 receive the probe signal and its reception strength is detected by reception strength detection circuit 28. A/D converted reception strength is then input into CPU 25.

CPU 25 stores information of the source IC tag 2 received from interrogator 1 in memory 26, when its reception strength is over a predetermined level.

The request signals sent by interrogator 1 to IC tags 2 include a series of commands such as: a unique ID readout command that reads a unique ID given to each IC tag 2; a probe signal send out command that instructs IC tags 2 to send out probe signals; and an adjacent ID readout command that reads the information (adjacent ID) of the source IC tag 2 stored in memory 26 by the other IC tags 2.

The request signals are transmitted specifying response requirements and anti-collision (avoiding collisions) protocols that communicate between interrogator 1 and IC tags 2 are operated so that only the IC tag 2 that meets the response requirements makes a response.

A collision of responses would not only result in prohibiting storing/retrieving of ID, but also in destructing data of IC tags 2 during storing operation in the worst case.

Therefore, the storing/retrieving of ID is performed only when one IC tag 2 makes a single response as a result of the anti-collision protocols.

Whether there is a singular response or plural responses can be detected by checking a bit pattern of a received signal using a cyclic check code (CRC) etc, since a disorder arises in the bit pattern when plural responses overlap: when an error is detected in the bit pattern, it is judged that there are plural responses.

Figure 3:
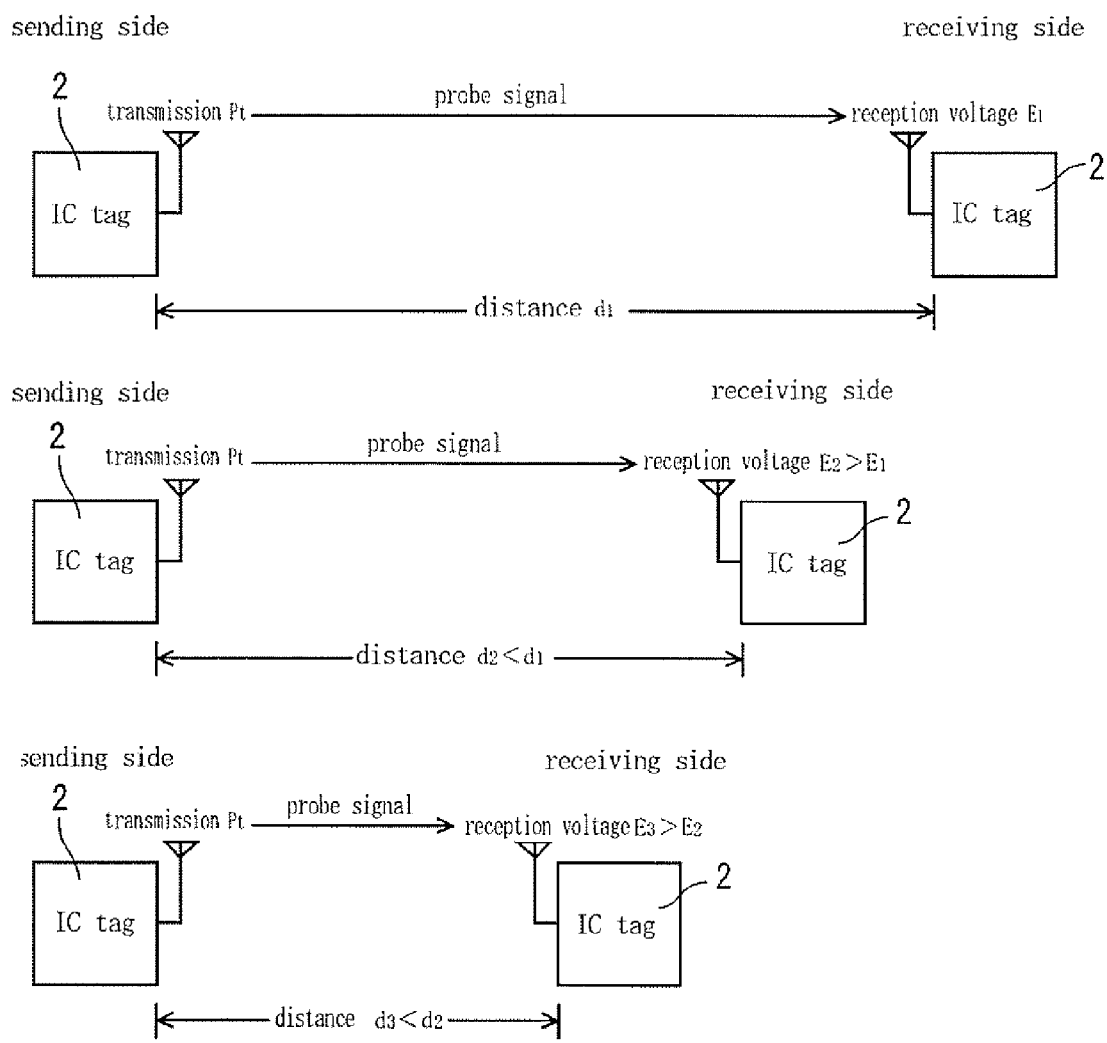
FIG. 3 shows how a reception voltage E changes in proportion with distance d.

In a free space, as shown in FIG. 3, when transmission power Pt (W) of the probe signal sent out by IC tag 2 on a sending side is constant, reception voltage E (V/m) that IC tag 2 on a receiving side receives is inversely proportional to distance d(m) between IC tags 2 on both sending and receiving sides.

Consequently, as distance d between IC tags 2 on both sending and receiving sides becomes shorter (as d1>d2>d3), reception voltage E received by IC tag 2 on the receiving side rises higher (as E1<E2<E3).

Therefore, the distance between IC tags 2 on both sending and receiving sides can be detected from the level of reception voltage E that IC tag 2 on the receiving side receives.

Figure 4:
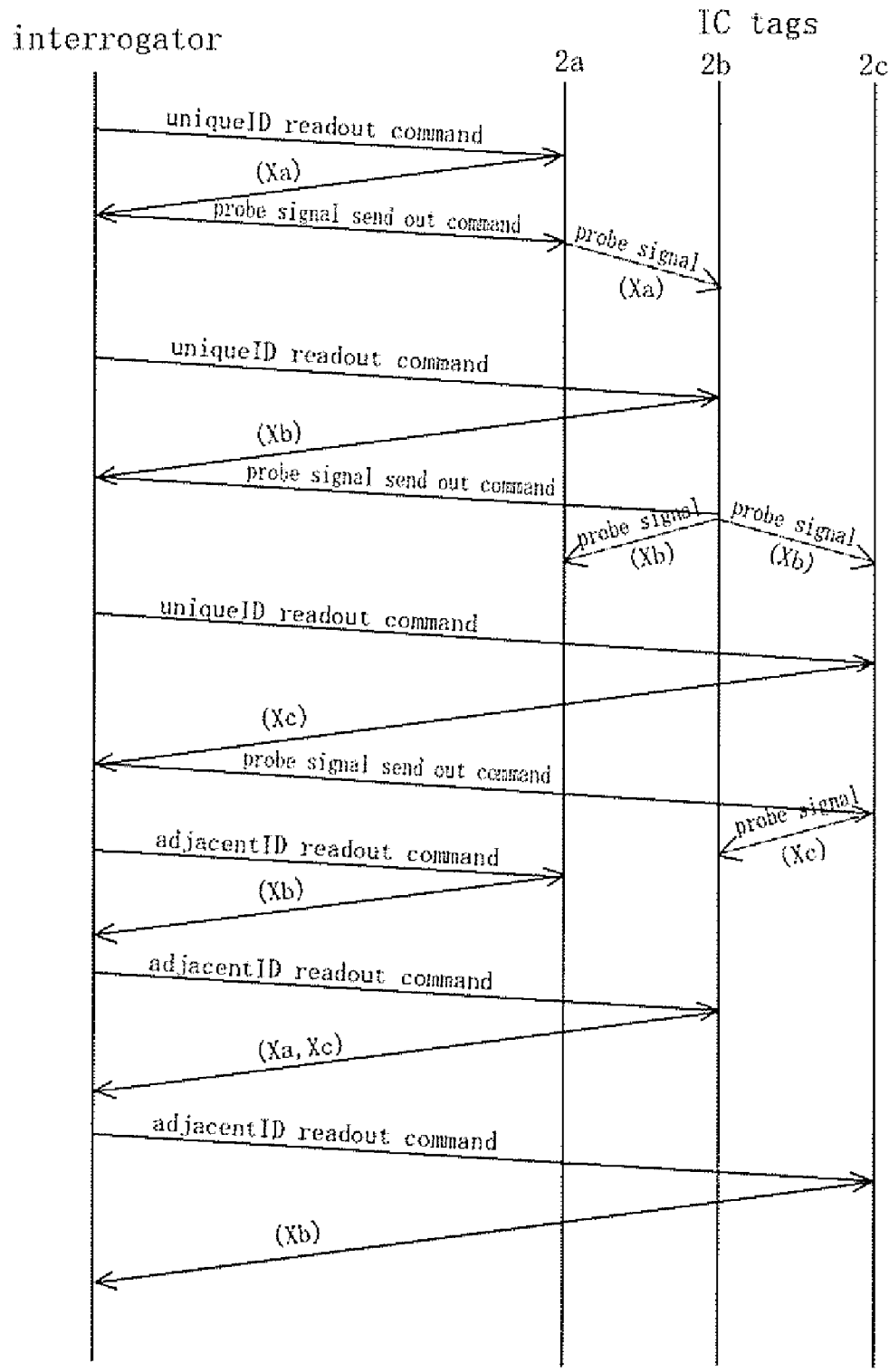
FIG. 4 is a sequence chart of protocols communicating between interrogator 1 and IC tags 2 according to the present invention.

A sequence chart of protocols communicating between interrogator 1 and IC tags 2 according to one embodiment of the present invention is shown in FIG. 4.

Firstly, interrogator 1 transmits the unique ID readout command specifying read range, and corresponding IC tags 2a, 2b, 2c reply their respective unique IDs (Xa), (Xb), (Xc).

At the same time, interrogator 1 transmits the probe signal send out command specifying ID, and corresponding IC tags 2a, 2b, 2c send out probe signals respectively.

At this time, IC tag 2 that has detected the probe signal whose reception strength is over a predetermined level stores IDs (Xa), (Xb), (Xc) specified by interrogator 1 in its memory as adjacent IDs.

Then, interrogator 1 transmits the adjacent ID readout command specifying ID, and corresponding IC tags 2a, 2b, 2c reply adjacent IDs (Xb), (Xa.Xc), (Xb) stored in their respective memories.

Lastly, all possible combinations (Xa-Xb), (Xb-Xa), (Xb-Xc), (Xc-Xb) of unique IDs (Xa), (Xb), (Xc) and adjacent IDs (Xb), (Xa.Xc), (Xb) that controller 3 has collected via interrogator 1 are obtained, and any identical combinations are excluded so that the final combinations (Xa-Xb), (Xb-Xc) remain. Then, any of the final combinations having one side in common are joined so that a link pattern of ID information (Xa-Xb-Xc) is produced.

Thus, it is understood that IC tags 2a, 2b, 2c exist in the same communication area B, and are arranged in order of 2a, 2b, 2c. In other words, their locations are recognized.

An operation between interrogator 1 and IC tags 2 is described below with reference to a flow chart.

Figure 5:
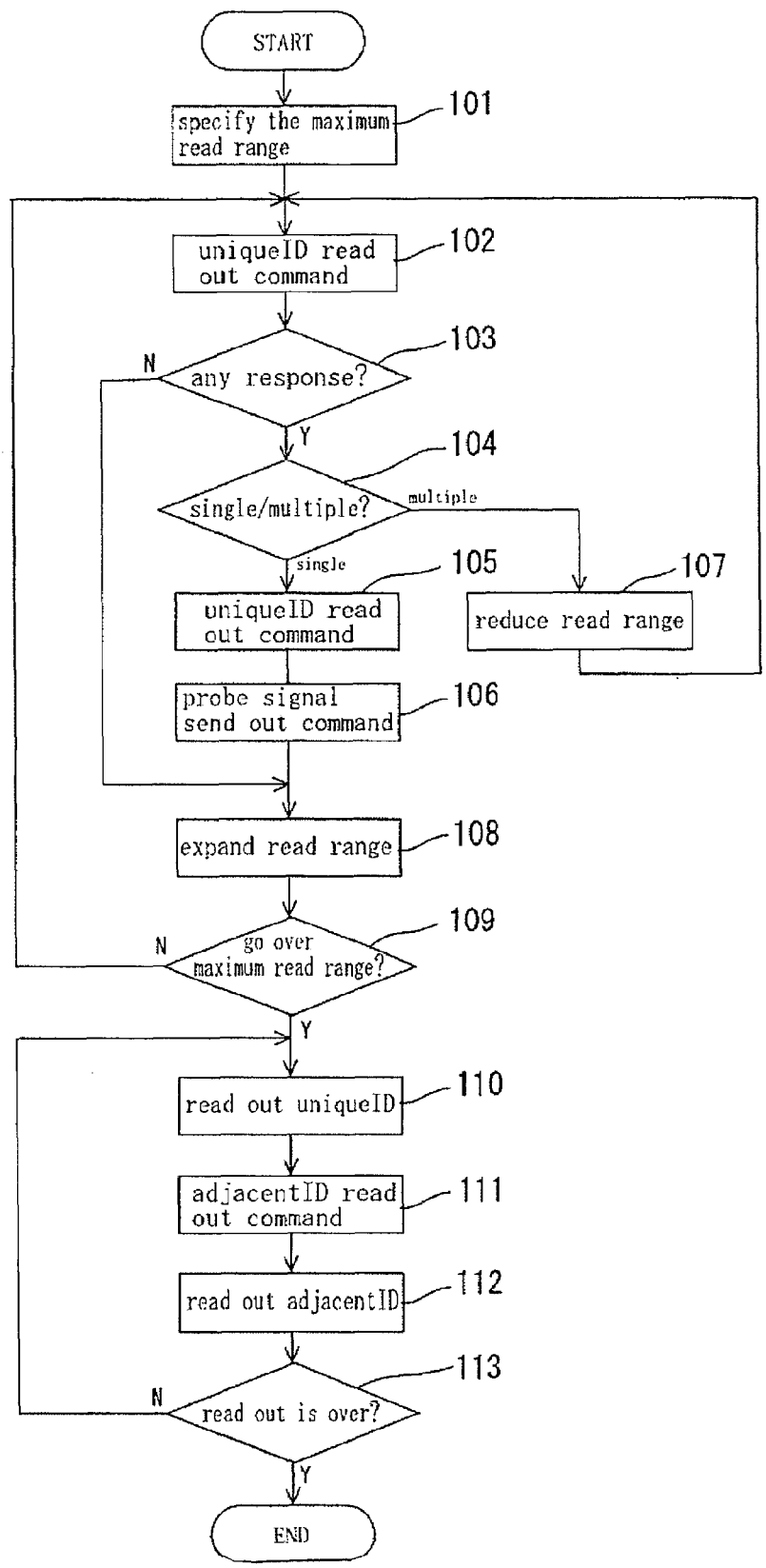
FIG. 5 is a process flow chart of interrogator 1.

A process flow chart of interrogator 1 is shown in FIG. 5.

The anti-collision protocols communicating between interrogator 1 and IC tags 2 as described below is based on the method that has been disclosed in a published patent application No. 2004-38621 of the present applicant, but the present invention is not limited to this method and other methods are also applicable.

Firstly, interrogator 1 specifies the maximum read range as the response requirements at step 101, and transmits the unique ID readout command to IC tags 2 at following step 102.

Next step 103 detects whether there is any response from IC tags 2. The process advances to step 104 when any response is detected, or advances to step 107 if no response is detected.

Step 104 detects whether the response(s) is/are from a single IC tag 2 or multiple IC tags 2. When single response is detected, the unique ID of responding IC tag 2 is read out and stored in the memory at step 105, and the probe signal send out command specifying the unique ID of the responding IC tag 2 is transmitted at next step 106.

When multiple responses are detected, the size of read range is reduced at step 107, and the process returns to step 102 to carry on transmitting next unique ID readout command.

The size of read range is expanded at next step 108, and whether it goes over the maximum read range is detected at next step 109. When it is over the maximum read range, the process advances to step 110, or when it is not over the maximum range, the process returns to step 102 to carry on transmitting next unique ID readout command.

At step 110 the unique IDs stored in the memory are retrieved sequentially. At next step 111, the adjacent ID readout command specifying the retrieved IDs as the response requirements is transmitted to IC tags 2, and at next step 112, the adjacent ID of responding IC tag 2 is read out and stored in the memory.

Next, whether the read out operation is terminated at step 113 is detected, and when it is not terminated, the process returns to step 110 to carry on the read out operation of next unique ID.

Figure 6:
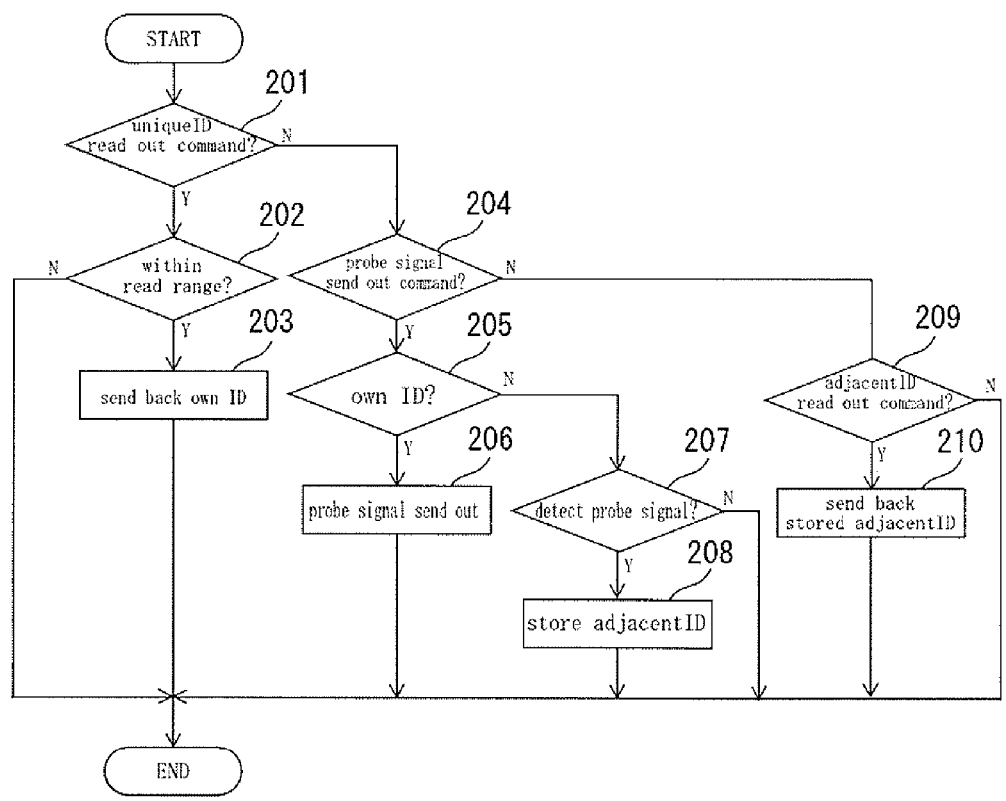
FIG. 6 is a process flow chart of IC tag 2.

A process flow chart of IC tag 2 is shown in FIG. 6.

IC tag 2 is activated when it receives the request signal from interrogator 1, and firstly detects whether the request signal is the unique ID readout command at step 201. When the unique ID readout command is detected, the IC tag 2 judges whether its own ID is within the specified read range at next step 202, and when it is within the read range, IC tag 2 sends its own ID back to interrogator 1 at step 203.

When the unique ID readout command is not detected, IC tag 2 judges whether the request signal is the probe signal send out command at step 204. When it is the probe signal send out command. IC tag 2 then judges whether its own ID is the specified unique ID at next step 205, and when it is the specified unique ID, IC tag 2 sends out a probe signal to other IC tags 2 at step 206.

When it is not the specified unique ID, IC tag 2 judges whether the sent by other IC tag 2 is detected with reception strength over a predetermined level at step 207, and when it is detected, IC tag 2 stores the specified unique ID as adjacent ID in the memory at next step 208.

When the probe signal send out command is not detected, the IC tag 2 judges whether the request signal is the adjacent ID readout command at step 209, and when it is the adjacent ID readout command, IC tag 2 sequentially retrieves the adjacent ID stored in the memory and sends it back to interrogator 1 at next step 210.

A first preferred embodiment of the present invention is described below.

Figure 7:
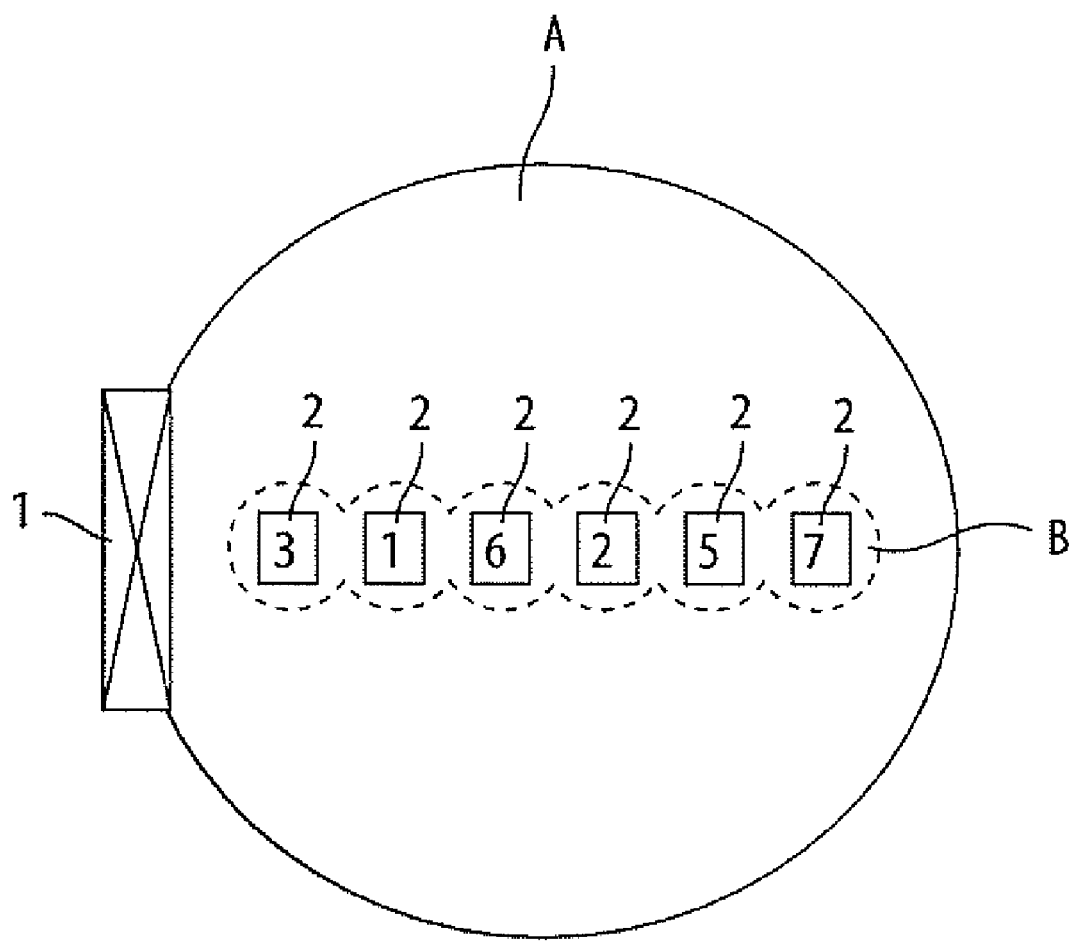
FIG. 7 is a schematic view of the first preferred embodiment of the present invention.

This embodiment is aimed at, for example, identifying what books are arranged in what order on one bookshelf, when the books on the bookshelf are provided with IC tags 2. In this embodiment as shown in FIG. 7, interrogator 1 makes data communication with IC tags 2 with IDs (3, 1, 6, 2, 5, 7) for example, which are arranged in line in said order within communication area A of interrogator 1 that corresponds to a library, and IC tags 2 exchange probe signals in communication area B that corresponds to a bookshelf.

Figure 8:
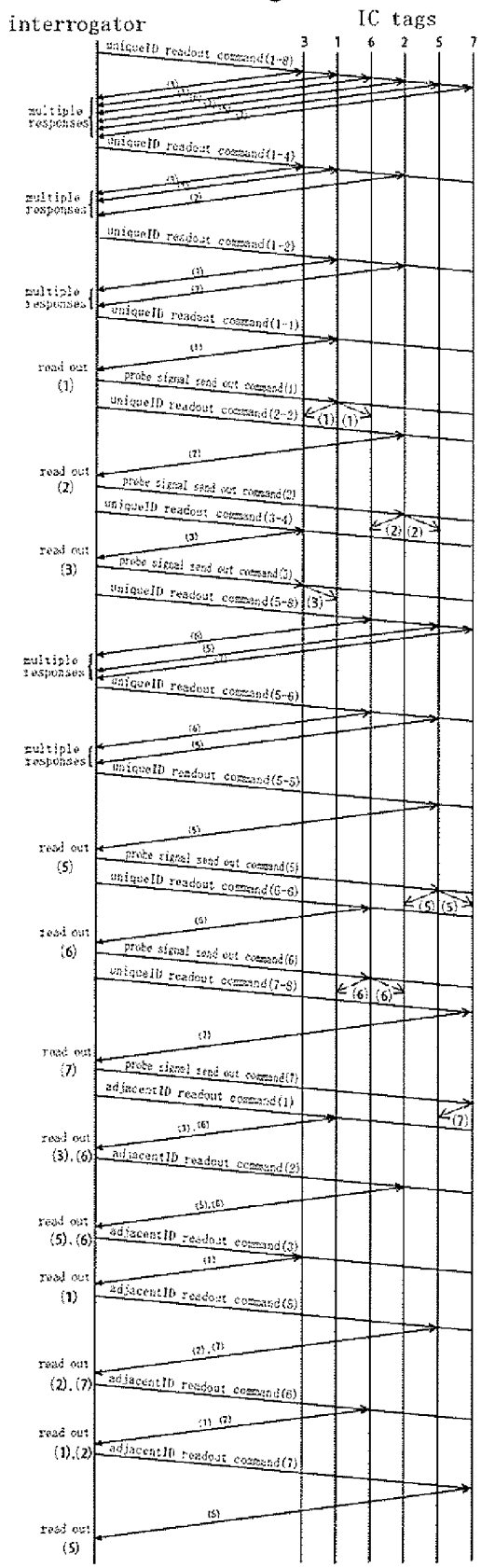
FIG. 8 is a sequence flow between interrogator 1 and IC tags 2 according to the first embodiment.

A sequence flow between interrogator 1 and IC tags 2 according to this embodiment is shown in FIG. 8.

Interrogator 1 firstly specifies the maximum read range 1~8 and transmits the unique ID readout command.

All IC tags 2 respond to this command.

Then interrogator 1, having received multiple responses, reduces the size of read range and transmits the unique ID readout command with read range 1~4.

IC tags 2 with IDs 3, 1, 2 respond to this command.

Interrogator 1, having received multiple responses, reduces the size of read range again and transmits the unique ID readout command with read range 1~2.

IC tags 2 with IDs 1, 2 respond to this command.

Interrogator 1, having received multiple responses, reduces the size of read range again and transmits the unique ID readout command with read range 1~1.

IC tag 2 with ID 1 only responds to this command.

Since interrogator 1 now has a single response, it reads out 1 as a detection number and then transmits the probe signal send out command specifying ID 1.

IC tag 2 with ID 1 sends out a probe signal and IC tags 2 with IDs 3, 6 store ID 1 as adjacent ID.

Next interrogator 1 shifts read range and transmits the unique ID readout command with read range 2~2.

IC tag 2 with ID 2 only responds to this command.

Since interrogator 1 now has a single response, it reads out 2 as a detection number and then transmits the probe signal send out command specifying ID 2.

IC tag 2 with ID 2 sends out a probe signal and IC tags 2 with IDs 5, 6 store ID 2 as adjacent ID.

Next interrogator 1 expands the size of read range and transmits the unique ID readout command with read range 3~4.

IC tag 2 with ID 3 only responds to this command.

Since interrogator 1 now has a single response, it reads out 3 as a detection number and then transmits the probe signal send out command specifying ID 3.

IC tag 2 with ID 3 sends out a probe signal and IC tag 2 with ID 1 stores ID 3 as adjacent ID.

Next interrogator 1 expands the size of read range and transients the unique ID readout command with read range 5~8.

IC tags 2 with IDs 6, 5, 7 respond to this command.

Interrogator 1, having received multiple responses, reduces the size of read range and transmits the unique ID readout command with read range 5~6.

IC tags 2 with IDs 6, 5 respond to this command.

Interrogator 1, having received multiple responses, reduces the size of read range again and transmits the unique ID readout command with read range 5~5.

IC tag 2 with ID 5 only responds to this command.

Since interrogator 1 now has a single response, it reads out 5 as a detection number and then transmits the probe signal send out command specifying ID 5.

IC tag 2 with ID 5 sends out a probe signal and IC tags 2 with IDs 2, 7 store ID 5 as adjacent ID.

Next interrogator 1 shifts read range and transmits the unique ID readout command with read range 6~6.

IC tag 2 with ID 6 only responds to this command.

Since interrogator 1 now has a single response, it reads out 6 as a detection number and then transmits the probe signal send out command specifying ID 6.

IC tag 2 with ID 6 sends out a probe signal and IC tag 2 with IDs 1, 2 store ID 6 as adjacent ID.

Next, interrogator 1 expands the size of read range and transmits the unique ID readout command with read range 7~8.

IC tag 2 with ID 7 only responds to this command.

Since interrogator 1 now has a single response here, it reads out 7 as a detection number and then transmits the probe signal send out command specifying ID 7.

IC tag 2 with ID 7 sends out a probe signal and IC tag 2 with ID 5 stores ID 7 as adjacent ID.

Next interrogator 1 expands the size of read range, but since it goes over the maximum read range, reading out of unique ID is ended.

Next, interrogator 1 transmits the adjacent ID readout command, sequentially specifying IDs that have been read out as detection numbers.

Interrogator 1 firstly specifies ID 1 and transmits the adjacent ID readout command.

IC tag 2 with ID 1 only responds to this command and simultaneously sends back IDs 3, 6 stored in the memory.

Interrogator 1 now reads out IDs 3, 6 as adjacent IDs of ID 1, then specifies ID 2 and transmits the adjacent ID readout command.

IC tag 2 with ID 2 only responds to this command and simultaneously send back IDs 5, 6 stored in the memory.

Interrogator 1 now reads out IDs 5, 6 as adjacent IDs of ID 2, then specifies ID 3 and transmits the adjacent ID readout command.

IC tag 2 with ID 3 only responds to this command and simultaneously sends back ID 1 stored in the memory.

The interrogator 1 then reads out ID 1 as adjacent ID of ID 3, then specifies ID 5 and transmits the adjacent ID readout command.

IC tag 2 with ID 5 only responds to this command and simultaneously sends back IDs 2, 7 stored in the memory.

Interrogator 1 now reads out IDs 2, 7 as adjacent IDs of ID 5, then specifies ID 6 and transmits the adjacent ID readout command.

IC tag 2 with ID 6 only responds to this command and simultaneously sends back IDs 1, 2 stored in the memory.

Interrogator 1 now reads out IDs 1, 2 as adjacent IDs of ID 6, then specifies ID 7 and transmits the adjacent ID readout command.

IC tag 2 with ID 7 only responds to this command and simultaneously sends back ID 5 stored in the memory.

Interrogator 1 then reads out ID 5 as adjacent ID of ID 7 and reading out is all ended.

Lastly, all possible combinations (1-3), (1-6), (2-5), (2-6), (3-1), (5-2), (5-7), (6-1), (6-2), (7-5) of unique IDs (1, 2, 3, 5, 6, 7) and adjacent IDs (3, 6), (5, 6), (1), (2, 7), (1, 2), (5) that controller 3 has collected via interrogator 1 are obtained and identical combinations are excluded so as that (1-3), (1-6), (2-5), (2-6), (5-7) remain as final combinations. Then, any of the final combinations having one side in common are joined so that a link pattern of ID information (3-1-6-2-5-7) is produced.

Thus, it is understood that IC tags 2 of (1, 2, 3, 5, 6, 7) exist in the same communication area B, and are ranged in order of 3, 1, 6, 2, 5, 7.

A second preferred embodiment of the present invention is described as below.

This embodiment, wherein the bookshelf as in the first embodiment is provided in two rows, is aimed at identifying what books are arranged in what order on bookshelves in two rows.

Figure 9:
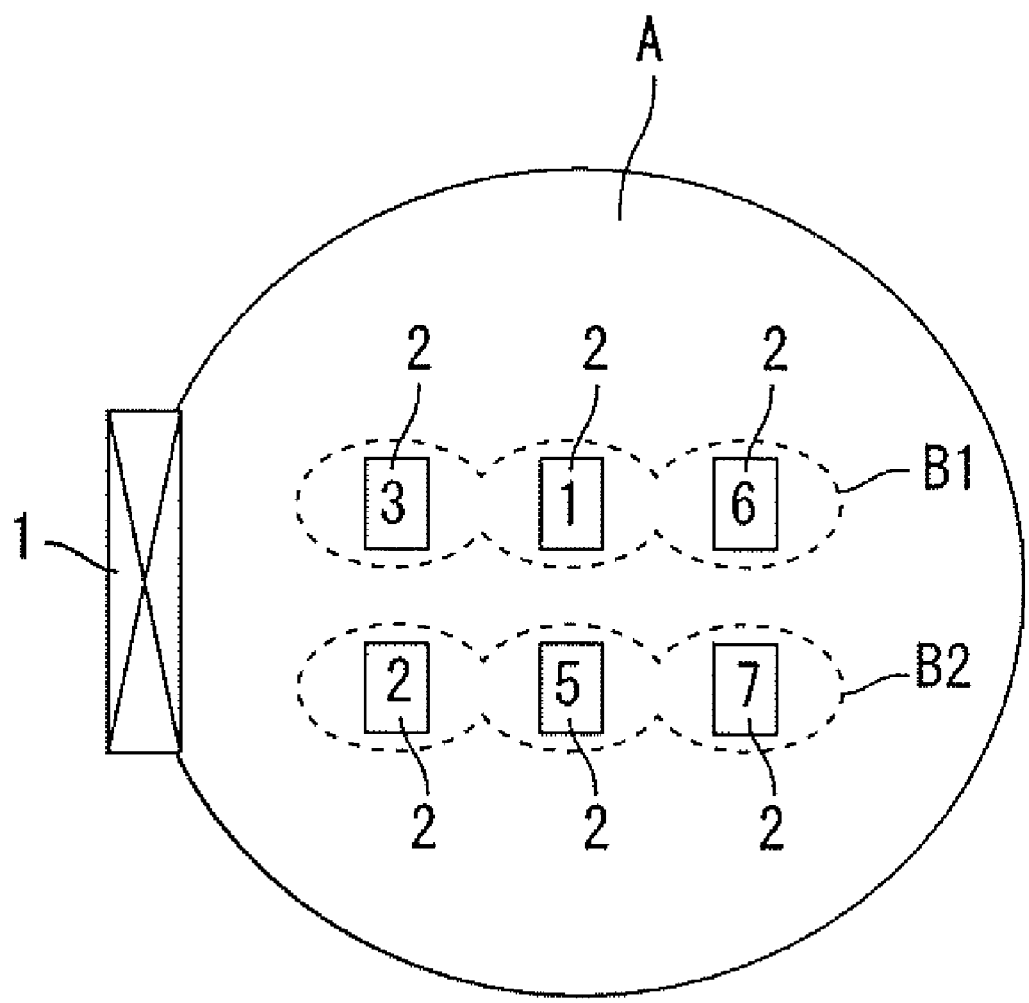
FIG. 9 is a schematic view of the second preferred embodiment of the present invention.

In this embodiment, as shown in FIG. 9, interrogator 1 makes data communication with IC tags 2 provided with IDs (3, 1, 6, 2, 5, 7) for example, which are arranged in two rows in the communication area A of interrogator 1 that corresponds to a library, and IC tags 2 with IDs (3, 1, 6) and IC tags 2 with IDs (2, 5, 7) exchange probe signals in their respective communication areas B1 and B2 that correspond to bookshelves. Communication areas B1 and B2 are separated by means such as alienating both areas or shielding between both areas.

Figure 10:
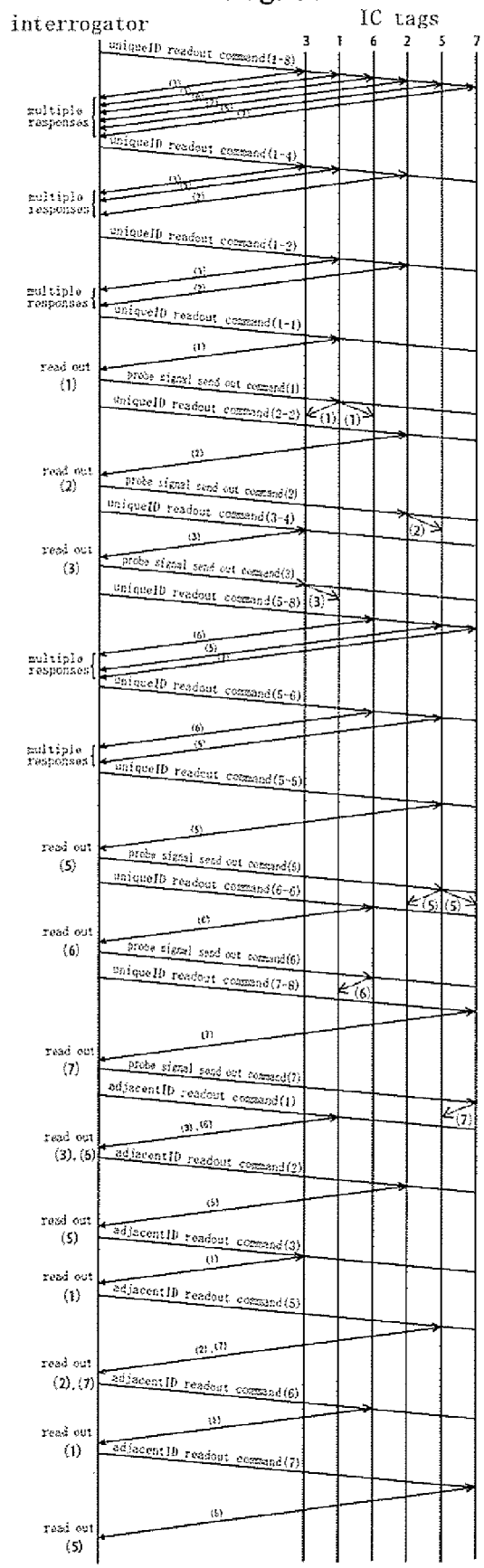
FIG. 10 is a sequence flow between interrogator 1 and IC tags 2 according to the second embodiment.

A sequence flow between interrogator 1 and IC tags 2 according to this embodiment is shown in FIG. 10.

Interrogator 1 firstly specifies the maximum read range 1~8 and transmits the unique ID readout command.

All IC tags 2 respond to this command.

Then interrogator 1, having received multiple responses, reduces the size of read range and transmits the unique ID readout command with read range 1~4.

IC tags 2 with IDs 3, 1, 2 respond to this command.

Interrogator 1, having received multiple responses, reduces the size of read range again and transmits the unique ID readout command with read range 1~2.

IC tag 2 with IDs 1, 2 respond to this command.

Interrogator 1, having received multiple responses, reduces the size of read range again and transmits the unique ID readout command with read range 1~1.

IC tag 2 with ID 1 only responds to this command.

Since interrogator 1 now has a single response, it reads out 1 as a detection number and then transmits the probe signal send out command specifying ID 1.

IC tag 2 with ID 1 sends out a probe signal and IC tags 2 with IDs 3, 6 store ID 1 as adjacent ID.

Next interrogator 1 shifts read range and transmits the unique ID readout command with read range 2~2.

IC tag 2 with ID 2 only responds to this command.

Since interrogator 1 now has a single response, it reads out 2 as a detection number and then transmits the probe signal send out command specifying ID 2.

IC tag 2 with ID 2 sends out a probe signal and IC tag 2 with ID 5 stores ID of 2 as adjacent ID.

Next, interrogator 1 expands the size of read range and transmits the unique ID readout command with read range 3~4.

IC tag 2 with ID 3 only responds to this command.

Since interrogator 1 now has a single response, it reads out 3 as a detection number and then transmits the probe signal send out command specifying ID 3.

IC tag 2 with ID 3 sends out a probe signal and IC tag 2 with ID 1 stores ID 3 as adjacent ID.

Interrogator 1 then expands the size of read range and transmits the unique ID readout command with read range 5~8.

IC tags 2 with IDs 6, 5, 7 respond to this command.

Interrogator 1, having received multiple responses, reduces the size of read range and transmits the unique ID readout command with read range 5~6.

IC tags 2 with IDs 6, 5 respond to this command.

Interrogator 1, having received multiple responses, reduces the size of read range again and transmits the unique ID readout command with read range 5~5.

IC tag 2 with ID 5 only responds to this command.

Since interrogator 1 now has a single response here, reads out 5 as a detection number and then transmits the probe signal send out command specifying ID 5.

IC tag 2 with ID 5 sends out a probe signal and IC tags 2 with IDs 2, 7 store ID 5 as adjacent ID.

Interrogator 1 then shifts read range and transmits the unique ID readout command with read range 6~6.

IC tag 2 with ID 6 only responds to this command.

Since interrogator 1 now has a single response, it reads out 6 as a detection number and then transmits the probe signal send out command specifying ID 6.

IC tag 2 with ID 6 sends out a probe signal and IC tag 2 with ID 1 stores ID 6 as adjacent ID.

Interrogator 1 then expands the size of read range and transmits the unique ID readout command with read range 7~8.

IC tag 2 with ID 7 only responds to this command.

Since interrogator 1 now has a single response, it reads out 7 as a detection number and then transmits the probe signal send out command specifying ID 7.

IC tag 2 with ID 7 sends out a probe signal and IC tag 2 with ID 5 stores ID 7 as adjacent ID.

Next, interrogator 1 expands the size of read range, but since it goes over the maximum read range, reading out of unique ID is ended.

Next, interrogator 1 transmits the adjacent ID readout command sequentially specifying IDs that have been read out as detection numbers. Interrogator 1 firstly specifies ID 1 and transmits the adjacent ID readout command.

IC tag 2 with ID 1 only responds to this command and simultaneously sends back IDs 3, 6 stored in the memory.

Interrogator 1 then reads out IDs 3, 6 as adjacent IDs of ID 1, then specifies ID 2 and transmits the adjacent ID readout command.

IC tag 2 with ID 2 only responds to this command and simultaneously sends back ID 5 stored in the memory.

Interrogator 1 now reads out ID 5 as adjacent ID of ID 2, then specifies ID 3 and transmits the adjacent ID readout command.

IC tag 2 with ID 3 only responds to this command and simultaneously sends back ID 1 stored in die memory.

Interrogator 1 now reads out ID 1 as adjacent ID of ID 3, then specifies ID 5 and transmits the adjacent ID readout command.

IC tag 2 with ID 5 only responds to this command and simultaneously send back IDs 2, 7 stored in the memory.

Interrogator 1 now reads out IDs 2, 7 as adjacent ID of ID 5, then specifies ID 6 and transmits the adjacent ID readout command.

IC tag 2 with ID 6 only responds to this command and simultaneously sends back ID 1 stored in the memory.

Interrogator 1 now reads out ID 1 as adjacent ID of ID 6, then specifies ID 7 and transmits the adjacent ID readout command.

IC tag 2 with ID 7 only responds to this command and simultaneously sends back ID 5 stored in the memory.

Interrogator 1 then reads out ID 5 as adjacent ID of ID 7 and reading out is all ended.

Lastly, all possible combinations (1-3), (1-6), (2-5), (3-1), (5-2), (5-7), (6-1), (7-5) of unique IDs (1, 2, 3, 5, 6, 7) and adjacent IDs (3, 6), (5), (1), (2,7), (1), (5) that controller 3 has collected via interrogator 1 are obtained and identical combinations are excluded so as that (1-3), (1-6), (2-5), (5-7) remain as final combinations. Then, any of the final combinations having one side in common are joined so that link patterns of ID information (3-1-6) and (2-5-7) are produced.

Thus, it is understood that IC tag 2 with IDs (1, 3, 6) and (2, 5, 7) exist in separate communication areas B1 and B2 respectively, and are arranged in order of (3, 1, 6) and (2, 5, 7).

A third preferred embodiment of the present invention is now described.

This embodiment, wherein IC tags 2 are adhered to pieces and their placing positions on a board of a board game such as "shogi" and "go", is aimed at identifying what piece is placed on which position on a board or on which position a target piece is placed.

Figure 11:
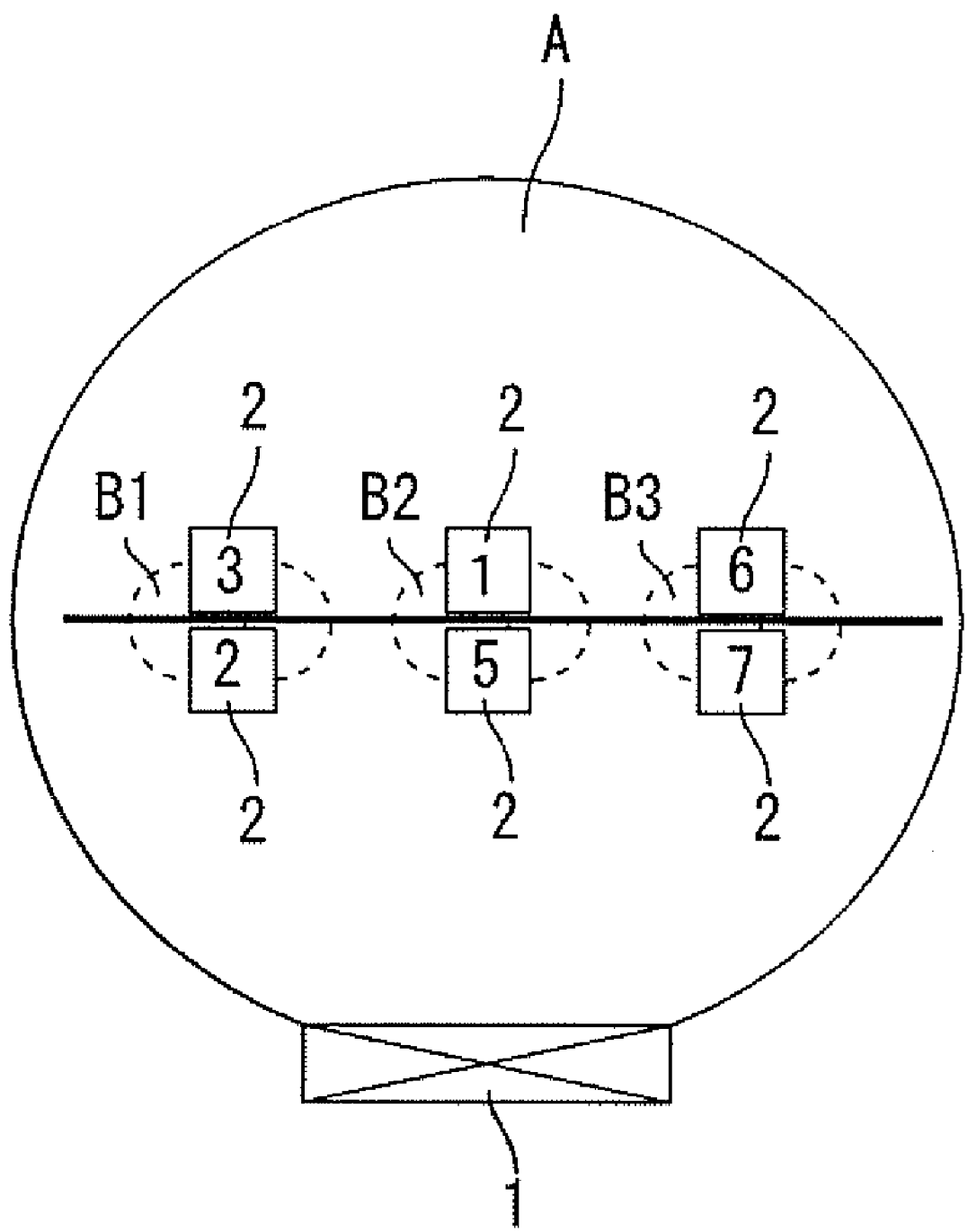
FIG. 11 is a schematic view of the third preferred embodiment of the present invention.

In this embodiment as shown in FIG. 11, IC tags 2 with IDs 3, 1, 6 for instance that correspond to pieces, and IC tags 2 with IDs 2, 5, 7 for instance that correspond to placing positions on a board, wherein the former IC tags are piled on the latter IC tags, are placed within communication area A of interrogator 1 that corresponds to a board. Interrogator 1 makes data communication with these IC tags 2 and IC tags 2 with IDs (3, 2), (1, 5) and (6, 7) exchange probe signals within their respective communication areas B1 B2 and B3 that corresponds to placing positions.

Communication areas B1, B2, and B3 are separated by meals such as setting up a range of probe signals less than several millimeters.

Figure 12:
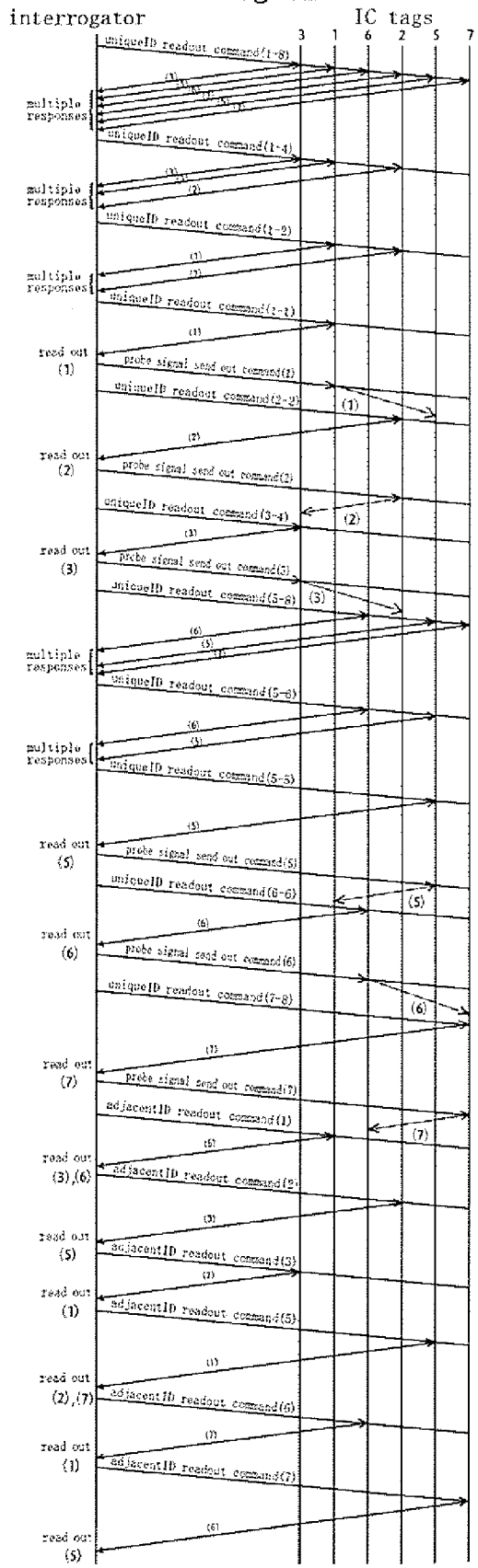
FIG. 12 is a sequence flow between an interrogator 1 and IC tags 2 according to the third embodiment.

A sequence flow between interrogator 1 and IC tags 2 according to this embodiment is shown in FIG. 12.

Interrogator 1 firstly specifies the maximum read range 1~8 and transmits the unique ID readout command.

All IC tags 2 respond to this command.

Then interrogator 1, having received multiple responses, reduces the size of read range and transmits the unique ID readout command with read range 1~4.

IC tags 2 with IDs 3, 1, 2 respond to this command.

Interrogator 1, having received multiple responses, reduces the size of read range again and transmits the unique ID readout command with read range 1~2.

IC tags 2 with IDs 1, 2 respond to this command.

Interrogator 1, having received multiple responses, reduces the size of read range again and transmits the unique ID readout command with read range 1~1.

IC tag 2 with ID 1 only responds to this command.

Since interrogator 1 now has a single response, it reads out 1 as a detection number and then transmits the probe signal send out command specifying ID 1.

IC tag 2 with ID 1 sends out a probe signal and IC tag 2 with ID 5 stores ID 1 as adjacent ID.

Next, interrogator 1 shifts read range and transmits the unique ID readout command with read range 2~2.

IC tag 2 with ID 2 only responds to this command.

Since interrogator 1 know has a single response, it reads out 2 as a detection number and then transmits the probe signal send out command specifying ID 2.

IC tag 2 with ID 2 sends out a probe signal and IC tag 2 with ID 3 stores ID 2 as adjacent ID.

Next interrogator 1 expands the size of read range and transmits the unique ID readout command with read range 3~4.

IC tag 2 with ID 3 only responds to this command.

Since interrogator 1 now has a single response, it reads out 3 as a detection number and then transmits the probe signal send out command specifying ID 3.

IC tag 2 with ID 3 sends out a probe signal and IC tag 2 with ID 2 stores ID 3 as adjacent ID.

Interrogator 1 then expands the size of read range and transmits the unique ID readout command with read range 5~8.

IC tags 2 with IDs 6, 5, 7 respond to this command.

Interrogator 1, having received multiple responses, reduces the size of read range and transmits the unique ID readout command with read range 5~6.

IC tags 2 with IDs 6, 5 respond to this command.

Interrogator 1, having received multiple responses, reduces the size of read range again and transmits the unique ID readout command with read range 5~5.

IC tag 2 with ID 5 only responds to this command.

Since interrogator 1 now has a single response, it reads out 5 as a detection number and then transmits the probe signal send out command specifying ID 5.

IC tag 2 with ID 5 sends out a probe signal and IC tag 2 with ID "1" stores ID 5 as adjacent ID.

Interrogator 1 then shifts read range and transmits the unique ID readout command with read range 6~6.

IC tag 2 with ID 6 only responds to this command.

Since interrogator 1 now has a single response, it reads out 6 as a detection number and then transmits the probe signal send out command specifying ID 6.

IC tag 2 with ID 6 sends out a probe signal and IC tag 2 with ID of 7 stores ID of 6 as adjacent ID.

Interrogator 1 then expands die size of read range and transmits the unique ID readout command with read range 7~8.

IC tag 2 with ID 7 only responds to this command.

Since interrogator 1 now has a single response, it reads out 7 as a detection number and then transmits the probe signal send out command specifying ID 7.

IC tag 2 with ID 7 sends out a probe signal and IC tag 2 with ID 6 stores ID 7 as adjacent ID.

Next interrogator 1 expands the size of read range, but since it goes over the maximum read range, reading out of unique ID is ended.

Interrogator 1 then transmits the adjacent ID readout command sequentially specifying IDs that have been read out as detection numbers.

Interrogator 1 firstly specifies ID 1 and transmits the adjacent ID readout command.

IC tag 2 with ID 1 only responds to this command and simultaneously sends back ID 5 stored in the memory.

Interrogator 1 now reads out ID 5 as adjacent ID of ID 1, then specifies ID 2 and transmits the adjacent ID readout command.

IC tag 2 with ID 2 only responds to this command and simultaneously sends back ID 3 stored in the memory.

Interrogator 1 now reads out ID 3 as adjacent ID of ID 2, then specifies ID 3 and transmits the adjacent ID readout command.

IC tag 2 with ID 3 only responds to this command and simultaneously sends back ID 2 stored in the memory.

Interrogator 1 now reads out ID 2 as adjacent ID of ID 3, then specifies ID 5 and transmits the adjacent ID readout command.

IC tag 2 with ID 5 only responds to this command and simultaneously sends back ID of 1 stored in the memory.

Interrogator 1 now reads out ID 1 as adjacent ID of ID 5, then specifies ID 6 and transmits the adjacent ID readout command.

IC tag 2 with ID 6 only responds to this command and simultaneously sends back ID 7 stored in the memory.

Interrogator 1 now reads out ID 7 as adjacent ID of ID 6, then specifies ID 7 and transmits the adjacent ID readout command.

IC tag 2 with ID 7 only responds to this command and simultaneously sends back ID 6 stored in the memory.

Interrogator 1 now reads out ID 6 as adjacent ID of ID 7 and all reading out is ended.

Lastly, all possible combinations (1-5), (2-3), (3-2), (5-1), (6-7), (7-6) of unique IDs (1, 2, 3, 5, 6, 7) and adjacent IDs (5, 3, 2, 1, 7, 6) that controller 3 has collected via interrogator 1 are obtained, and identical combinations are excluded so as that (1-5), (2-3), (6-7) remain as final combinations.

In this case, these combinations are considered as link patters of ID information, since none of the final combinations has one side in common.

Thus, it is understood that IC tags 2 with IDs (1, 5), (2, 3), and (6, 7) exist in separate communication areas B1, B2, and B3 respectively, and that IC tags 2 with IDs 3, 1, 6, which correspond to pieces of a board game, are positioned in contact with IC tags 2 with IDs 2, 5, 7, which correspond to placing positions on a board.

INDUSTRIAL APPLICABILITY

In the location recognition system using IC tags according to the present invention, the IC tags communicate each other using probe signals in communication area B (<A), whose range is less than that of communication area A of the interrogator and the IC tags. When a probe signal with reception strength over a predetermined level is received, the receiving IC tag stores information Y of the source IC tag in the memory, and sends back its own information X and information Y of the source IC tag (adjacency information) stored in the memory to the interrogator, so that the relative position of the IC tags could be recognized from information X and information Y collected via the interrogator.

Therefore, the IC tags in communication area A can be divided into groups according to their relative positions, and locations of the IC tags can be specified by making these groups and the IC tags arbitrary correspond.

Accordingly, it will be possible that items in inventory locations and inventory locations of items can both be recognized by using only one interrogator or antenna, without requiring interrogators or antennas be allocated at respective inventory locations.

Moreover, it is not necessary to deliberately shield the inventory locations from each other in order to prevent misreading caused by radio wave leakage.

The invention claimed is:

1. A system for location recognition using IC tags, wherein an interrogator makes a first communication with multiple IC tags existing in a communication area A by radio, and at the same time, one of said multiple IC tags makes a second communication with other IC tags existing in a communication area B (<A) by probe signals, the one of said multiple IC tags comprising:
  a first responder that responds with own information Xa to the interrogator;
  a transmitter that sends said probe signals to the other IC tags when own information Xa is specified by the interrogator;
  a receiver that receives a probe signal sent out by one IC tag of the other IC tags whose information Xb is specified by the interrogator;
  a storage that stores information Xb of the one IC tag of the other IC tags specified as a source IC tag by the interrogator in a memory when a reception strength of said probe signal is more than a predetermined level; and
  a second responder that responds with the information Xb of the source IC tag stored in the memory to the interrogator in response to a readout command,
  wherein relative positions of said multiple IC tags are recognized from the information Xa and the information Xb collected via the interrogator and wherein the storage stores the information Xb of the one IC tag of the other IC tags until the readout command is received, the readout command specifying the one of said multiple IC tags corresponding to information Xa.

2. The system for location recognition using IC tags as described in claim 1, wherein all possible combinations of the information Xa and information Xb are obtained, and any of the combinations having one side of information in common are joined so that locations and arrangement order of said multiple IC tags are specified.

3. The system for location recognition using IC tags as described in claim 1, wherein one of a radio, magnetism, sound, and light wave is used for the probe signals.

4. The system for location recognition using IC tags as described in claim 1, wherein a communication range of the communication area B is adjusted at different lengths depending on sizes and arrangement of items to which said multiple IC tags are affixed.

5. The system for location recognition using IC tags as described in claim 1, wherein responses of said first responder and said second responder are sent to said multiple IC tags existing in the communication area A while the interrogator specifies response requirements to avoid collisions.

6. The system for location recognition using IC tags as described in claim 1, wherein the probe signals are transmitted to said multiple IC tags existing in the communication area A while the interrogator specifies response requirements to avoid collisions.

7. A method for location recognition using IC tags, wherein an interrogator makes a first communication with multiple IC tag existing in a communication area A by radio, and at the same time, one of the multiple IC tags makes a second communication with other IC tags existing in a communication area B (<A) by probe signals, the method comprising;

having the one of the multiple IC tags respond with own information Xa to the interrogator;

having the one of the multiple IC tags transmit the probe signals to the other IC tags when own information Xa, is specified by the interrogator;

receiving, by the one of the multiple IC tags, probe signals sent by one IC tag of the other IC tags whose information Xb is specified by the interrogator;

storing, by the one of the multiple IC tags, information Xb of the one IC tag of the other IC tags as a source IC tag by the interrogator in a memory when a reception strength of a probe signal is more than a predetermined level; and responding, by the one of the multiple IC tags, with information Xb of the source IC tag to the interrogator in response to a readout command, wherein relative position of the multiple IC tags are recognized from the information Xa and the information Xb collected via the interrogator, and wherein the information Xb of the one IC tag of the other IC tags is stored until the readout command is received, the readout command specifying the one of the multiple IC tags corresponding to information Xa.

8. The system for location recognition using IC tags as described in claim 1, wherein the probe signals are omnidirectional propagation media, and wherein the probe signals become attenuated progressively with distance.

9. The system for location recognition using IC tags as described in claim 3, wherein the probe signals are omnidirectional propagation media, and wherein the probe signals become attenuated progressively with distance.

* * * * *